United States Patent
Keller

(10) Patent No.: US 10,946,619 B2
(45) Date of Patent: *Mar. 16, 2021

(54) LAMINATED GLASS COMPRISING A FUNCTIONAL FILM

(71) Applicant: Kuraray Europe GmbH, Hattersheim (DE)

(72) Inventor: Uwe Keller, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 423 days.

This patent is subject to a terminal disclaimer.

(21) Appl. No.: 15/491,261

(22) Filed: Apr. 19, 2017

(65) Prior Publication Data

US 2017/0334172 A1    Nov. 23, 2017

(30) Foreign Application Priority Data

May 19, 2016   (EP) .................................. 16170488

(51) Int. Cl.
   *B32B 17/06*   (2006.01)
   *B32B 17/10*   (2006.01)
   *B32B 3/26*    (2006.01)

(52) U.S. Cl.
   CPC .............. *B32B 17/06* (2013.01); *B32B 3/266* (2013.01); *B32B 17/064* (2013.01);
   (Continued)

(58) Field of Classification Search
   CPC ....... B32B 17/00; B32B 17/06; B32B 17/064; B32B 17/08; B32B 17/10;
   (Continued)

(56) References Cited

U.S. PATENT DOCUMENTS 3,458,388 A * 7/1969 Moynihan ......... B32B 17/10036
                                                      428/437
5,066,525 A * 11/1991 Nakamachi ....... B32B 17/10036
                                                      428/480
(Continued)

FOREIGN PATENT DOCUMENTS

EP    1527107    5/2005
EP    1 606 325  12/2005
(Continued)

OTHER PUBLICATIONS

Definition of "colour". A Dictionary of Science, Sixth Edition, p. 178. Oxford University Press. (Year: 2010).*
(Continued)

*Primary Examiner* — Maria V Ewald
*Assistant Examiner* — Ethan A. Utt
(74) *Attorney, Agent, or Firm* — Brooks Kushman P.C.

(57) ABSTRACT

Laminated glass consists of two glass sheets interlayered with at least one film A containing a polyvinyl acetal PA and optionally at least one plasticiser WA, at least one film B containing a polyvinyl acetal PB and at least one plasticiser WB and polymer film C, wherein film A comprises less than 16% by weight of plasticiser WA, film B comprises at least 16% by weight of plasticiser WB, film C comprises polyamide, polyethylene terephthalate (PET), polybutylene terephthalate (PBT), polyvinyl alcohol (PVA), polylactic acid (PLA), cellulose acetate or ionomers, and wherein film C is located between film A and film B.

3 Claims, 1 Drawing Sheet

(52) U.S. Cl.
CPC .... *B32B 17/1022* (2013.01); *B32B 17/10036* (2013.01); *B32B 17/1066* (2013.01); *B32B 17/10568* (2013.01); *B32B 17/10633* (2013.01); *B32B 17/10688* (2013.01); *B32B 17/10761* (2013.01); *B32B 2250/03* (2013.01)

(58) Field of Classification Search
CPC ........ B32B 17/10009; B32B 17/10036; B32B 17/10165; B32B 17/10339; B32B 17/10357; B32B 17/1055; B32B 17/10559; B32B 17/10568; B32B 17/10605; B32B 17/10614; B32B 17/10633; B32B 17/10651; B32B 17/1066; B32B 17/10697; B32B 17/10724; B32B 17/10761; B32B 17/10779; B32B 23/00; B32B 23/04; B32B 23/08; B32B 23/14; B32B 23/16; B32B 23/18; B32B 23/20; B32B 27/00; B32B 27/06; B32B 27/08; B32B 27/18; B32B 27/20; B32B 27/30; B32B 27/306; B32B 27/34; B32B 27/36; B32B 2329/00; B32B 2329/04; B32B 2329/06; B32B 2331/00; B32B 2331/04; B32B 2367/00; B32B 2377/00; B32B 3/26; B32B 3/263; B32B 3/266; B32B 3/24; B32B 17/10174; B32B 17/1022; B32B 17/10229; B32B 17/10238; B32B 17/10577; B32B 17/10587; B32B 17/10596; B32B 17/10807; B32B 17/10816; B32B 17/10825; B32B 17/10871; B32B 17/1088; B32B 17/10889; B32B 17/10899; B32B 17/10917; B32B 17/10935; B32B 17/10954; B32B 17/10972; B32B 15/00; B32B 15/04; B32B 15/08; B32B 15/082; B32B 15/085; B32B 15/09; Y10T 428/31616; Y10T 428/3162; Y10T 428/31623; Y10T 428/31627; Y10T 428/3163; Y10T 428/31634; Y10T 428/31638; Y10T 428/31725; Y10T 428/31739; Y10T 428/31743; Y10T 428/31746; Y10T 428/3175; Y10T 428/31754; Y10T 428/31757; Y10T 428/31768; Y10T 428/31786; Y10T 428/3179; Y10T 28/31794; Y10T 428/31797; Y10T 428/24273; Y10T 428/24298; Y10T 428/24306; Y10T 428/24314; Y10T 428/24322; Y10T 428/24331; Y10T 428/24479; Y10T 428/24612; Y10T 428/31645; Y10T 428/31649; Y10T 428/31678; Y10T 428/31681; Y10T 428/31855; Y10T 428/31909; Y10T 428/31928; Y10T 428/31935
USPC ....... 428/426, 430, 431, 435, 436, 437, 438, 428/439, 474.4, 475.5, 475.8, 476.1, 428/476.3, 476.6, 476.9, 478.2, 480, 481, 428/482, 483, 500, 507, 508, 510, 515, 428/516, 518, 520, 522, 523, 131, 134, 428/135, 136, 137, 138, 156, 172, 441, 428/442, 457, 458
See application file for complete search history.

(56) References Cited

U.S. PATENT DOCUMENTS

| | | | |
|---|---|---|---|
| 7,312,275 B2 | 12/2007 | Papenfuhs et al. | |
| 7,358,304 B2 | 4/2008 | Papenfuhs et al. | |
| 7,378,150 B2 | 5/2008 | Fugiel et al. | |
| 7,511,096 B2 | 3/2009 | Papenfuhs et al. | |
| 7,528,192 B2 | 5/2009 | Papenfuhs et al. | |
| 2006/0210776 A1* | 9/2006 | Lu | B32B 17/10568 428/192 |
| 2007/0009714 A1* | 1/2007 | Lee | B32B 17/10761 428/172 |
| 2011/0076473 A1 | 3/2011 | Lin | |
| 2014/0020759 A1* | 1/2014 | Oda | B32B 17/10761 428/156 |
| 2014/0224423 A1* | 8/2014 | Keller | B32B 17/10761 156/313 |
| 2015/0217540 A1 | 8/2015 | Keller | |
| 2015/0217547 A1 | 8/2015 | Greb et al. | |
| 2016/0263866 A1 | 9/2016 | Keller | |

FOREIGN PATENT DOCUMENTS

| | | | | |
|---|---|---|---|---|
| EP | 2269816 A1 * | 1/2011 | ....... B32B 17/10761 |
| JP | 2001163640 A | 6/2001 | |
| WO | 03/020776 A1 | 3/2003 | |
| WO | 2004005358 A1 | 1/2004 | |
| WO | 2004063231 A1 | 7/2004 | |
| WO | 2004063232 A1 | 7/2004 | |
| WO | 2005059013 A1 | 6/2005 | |
| WO | 2015078989 A1 | 6/2015 | |

OTHER PUBLICATIONS

European Search Report to EP Application No. 16170488, dated Nov. 16, 2016, 2 pages.

* cited by examiner

LAMINATED GLASS COMPRISING A FUNCTIONAL FILM

CROSS-REFERENCE TO RELATED APPLICATIONS

This application claims priority to European Patent Application No. 16170488.7 filed May 19, 2016, the disclosure of which is incorporated in its entirety by reference herein.

BACKGROUND OF THE INVENTION

1. Field of the Invention

The present invention relates to laminated glass comprising a functionalised polymer film sandwiched between two films based on polyvinyl acetal, having high and low plasticiser content.

2. Background Art

It is known to provide laminated glass with additional features like heat shielding or improved penetration resistance by embedding a thin, optionally functionalised polymer film in the laminate. In this purpose, thin PET films are widely used since they have high modulus of elasticity and good heat resistance and can be easily functionalised, for example by sputtering with heat-shielding materials.

In order to produce laminated glass sheets with heat-shielding properties, thin PET films coated in an IR-absorbing or IR-reflecting manner are embedded between a plurality of layers of plasticiser-containing polyvinyl acetal. This system has the disadvantage that at least 3 film layers (1× functionalised PET, 2×PVB film) always have to be used, since PET cannot be melted directly on a glass surface. This technology is described for example in US2011/00767473. However, functionalized thin PET film does not adhere to glass and therefore needs to be embedded between two adhesive layers. This sandwich is difficult to handle and—if standard adhesive layers are used—quite thick.

As an alternative to this, WO 2005/059013 A1 proposes the application of heat-absorbing nanoparticles by printing PVB film with special printing inks. However, the adhesion properties of the film to the glass surface can be adversely affected by the printing.

Due to the fact that PVB films must have a roughened surface in order to remove the air in a lamination process without difficulty, it is likely that a thin PET film applied thereto, will be optically uneven following pressing with a glass surface. In addition, the printing of thick plasticised film webs is difficult, since such films are elongated as they are unwound and may then shrink back again.

SUMMARY OF THE INVENTION

The problem addressed by the present invention was therefore to provide intermediate layer films comprising an optionally functionalised polymer film without sacrificing the necessary safety and thickness properties of laminated glazing as required for automobile or architectural windows. It has now been surprisingly found that polymer films produced, for example, from PET, can be advantageously combined with thin films based on polyvinyl acetal having low amounts or no plasticiser and that these films can be melted directly on one of the glass surfaces with the typical production methods for laminated glass laminates. The usual required safety properties of laminated glass laminates can then be obtained in combination with at least one layer formed of plasticiser-containing polyvinyl acetal.

DETAILED DESCRIPTION OF THE PREFERRED EMBODIMENTS

Figure 1:
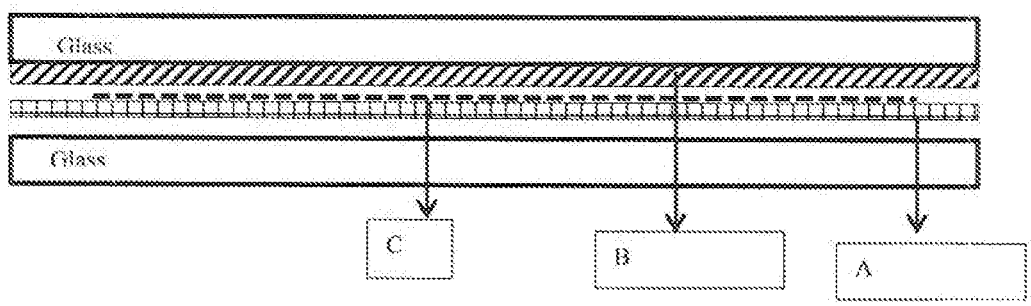
FIG. 1 illustrates one embodiment of a glass laminate of the invention.

The invention therefore relates to a laminated glass, consisting of two glass sheets interlayered with at least one film A containing a polyvinyl acetal PA and optionally at least one plasticiser WA, at least one film B containing a polyvinyl acetal PB and at least one plasticiser WB and polymer film C, characterised in that film A comprises less than 16% by weight of plasticiser WA, film B comprises at least 16% by weight of plasticiser WB, film C comprises polyamide, polyethylene terephthalate (PET), polybutylene terephthalate (PBT), polyvinyl alcohol (PVA), polylactic acid (PLA), cellulose acetate or ionomers, and wherein film C is located between film A and film B.

Film C preferably has a thickness in a range between 10-1000 µm, more preferably 20-500 µm, yet more preferably 30 µm-200 µm, and most preferably 40 µm-150 µm. The thickness of a film A is 10-150 µm, preferably 20-120 µm.

In a preferred embodiment of the invention, the tensile stress of film C @ 10% elongation is at least 100% that of film B, preferably @ 150% of film B and most preferably 200% of the tensile stress of film B @ 10% elongation when measured according to DIN EN ISO 527-1/527-3 (23° C./30% RH). This embodiment provides laminated glass with enhanced penetration resistance.

In another embodiment, films C are provided with a heat-shielding function. The term "heat-shielding function" refers to films which have a reduced total solar transmittance (TTS) measured as follows:

TTS (film C as a base film)—TTS (film C with heat-shielding properties), in order of preference, >10%, >12.5%, >15%, >17.5% or >20%

Total solar transmittance (TTS) is measured according to ISO 13837:2008 (v=14 m/s; value in %) in a test laminate consisting of 2×2.1 mm clear glass (for example Planilux™) and a standard automotive film as film B (for example TROSIFOL VG R10 0.76) in combination with a film C and A, each as film without heat-shielding function as compared to a laminate wherein film C has the heat-shielding function.

In addition, film C with heat-shielding function may be defined by a high ratio of light transmission (TL, measured in accordance with EN 410; 2011, value in %) to heat-shielding effectiveness. Heat-shielding films C used in accordance with the invention preferably have quotients of TL/TTS of more than 1.2, more than 1.25, more than 1.30, more than 1.35, more than 1.40, or more than 1.45.

The heat-shielding function of films C may be provided by a metallic coating for example containing silver, gold, indium, aluminium or rhodium. The coating may have a thickness of 1-500 nm and can be applied for example by chemical vapour decomposition methods. A good commercial example of such heat-shielding film is EASTMAN XIR® SOLAR CONTROL FILMS which consist of PET substrate film carrying different kind of metallic coating which reflect heat radiation but keep a relatively high light transmission.

In a another embodiment film C may contain heat-shielding particles, for example ITO, ATO, AZO, IZO, zinc antimonates, tin-doped zinc oxide, silicon-doped zinc oxide, gallium-doped zinc oxide, tungstates, such as $LiWO_3$, $NaWO_3$, $CsWO_3$, lanthanum hexaboride or cerium hexaboride.

In further embodiments film A and/or B may contain the aforementioned heat shielding particles. The heat-shielding properties of films A and/or B may be provided in addition or separately to heat-shielding function of film C.

The heat-shielding particles preferably have a mean diameter from 5 to 500 nm. The proportion of heat-shielding particles in or on the films A, B and/or C may be 1-20% by weight, preferably 2-10% by weight. The proportion of heat-shielding particles in or on the film B may be 0.05-2% by weight, preferably 0.2-1% by weight.

Films A and/or C may comprise electrically conductive structures, such as heating wires, antennas or other layers having optical functions or may be decoratively printed. If film C is metallized, such coating may as well be used as resistive heater.

The films A and B may contain, in the starting state prior to lamination of the layers and also in the intermediate layer stack located in the laminated glass laminate, a single plasticiser as well as mixtures of plasticisers both of different and identical composition. The term "different composition" refers to both the type of plasticiser and proportion thereof in the mixture. In regions of the glass laminate in which film C is interposed between film B and film A, no or only very slow migration of plasticizer between films A and B is possible. In regions of the glass laminate free of film C (e.g. a cut-out or back-cut area at the laminated edge) film A and film B preferably have the same plasticisers WA and WB in the finished laminate.

Plasticiser-containing films B used in accordance with the invention contain at least 16% by weight, such as 16.1-36.0% by weight, preferably 22.0-32.0% by weight and in particular 26.0-30.0% by weight plasticiser.

Films A used in accordance with the invention may contain less than 16% by weight (such as 15.9% by weight), less than 12% by weight, less than 8% by weight, less than 6% by weight, less than 4% by weight, less than 3% by weight, less than 2% by weight, less than 1% by weight or even no plasticiser (0.0% by weight). Films A with a low plasticiser content preferably contain 0.0-8% by weight plasticiser.

In the method according to the invention, the film A has a thickness of no more than 20%, preferably no more than 15%, and preferably no more than 10% of the thickness of the film or films B.

The thickness of a film A is 10-150 μm, preferably 20-120 μm, more preferably 30-100 μm, yet more preferably 40-80 μm and most preferably 50-70 μm.

Film A is produced separately from film B (for example extruded) and has either no plasticiser at all or a small proportion of plasticiser. For the case, that film A is equipped heat-shielding particles, the dispersion of the latter is not influenced adversely by such a low plasticizer content.

The thickness of a film B is 450-2500 μm, preferably 600-1000 μm, more preferably 700-900 μm. With use of a plurality of films B, the same is true for the total thickness thereof. If films B are stretched prior to production of the sandwich and/or additionally are adapted to the shape of a screen (for example a windscreen) in a curved manner, the specified thicknesses at the moment of lamination may reduce once more by up to 20%.

At least one thin film A is oriented relative to an inner glass surface of the glass laminate whereas at least one film C is encapsulated between film A and film B in the glass laminate according to the invention. It is also possible to apply a film A to both glass surfaces, such that a laminated glass with a layer sequence like glass/film A/film C/film B/film C/film A/glass is provided. Here, the decoration of the films A and C may be the same or different.

In the case of automotive glazing, it is not preferable for aesthetic and stability reasons to seal the edges of the laminated glass laminates with sealants. This promotes the susceptibility of such glazing to the formation of edge defects, such as detachments of the layers from one another (delamination) or corrosion or chemical modification of an IR-absorbing layer reaching as far as the edge of the laminate.

In the method according to the invention, the film C can be tailor cut and positioned such that it does not reach everywhere in the laminated glass laminate as far as the edge of the laminate. In particular, the film C can be smaller in the edge region by at least 1 mm compared with at least one glass sheet, such that the film A and film B in this edge region are in direct contact with each other and at least one glass sheet.

In another embodiment, both film A and C are smaller than by at least 1 mm compared to film B and at least one glass sheet, such that the periphery of the laminate is exclusively sealed by film B which in this case makes contact to both inner glass surfaces in this edge region.

Furthermore, the thin film C can be perforated prior to the insertion into the glass/film sandwich, such that it can have openings, such as passages, holes or slits, in any geometric patterns.

The film C can thus have at least one opening, such that by means of this opening the film B and film A are in direct contact with each other. In particular, openings can thus be obtained at points of the laminated glass behind which the function of sensor elements, optics elements and/or antenna elements would otherwise be hindered by a e.g. metallic heat-shielding layer.

Film C may have a size and position in the laminate such that it does not reach everywhere in the laminated glass to all edges of the laminate. In particular, the film may be smaller than the glass sheets and/or film B and/or film A.

For example, films A and B may have the same size as the glass sheets and film C has a smaller size resulting in direct contact between films A and B at the periphery of the laminate.

Figure 2:
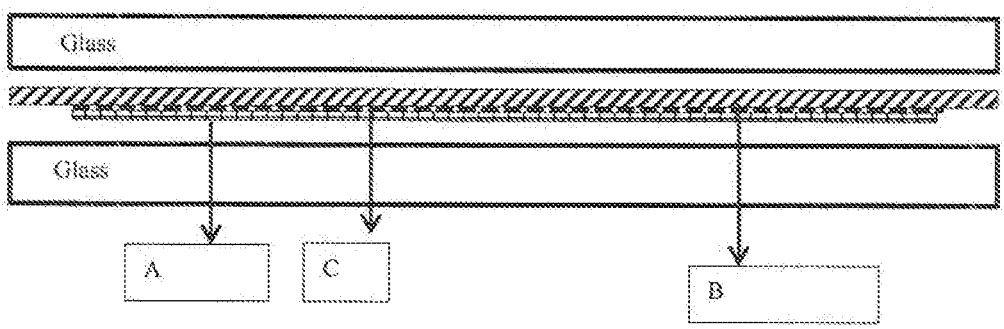
FIG. 2 illustrates a further embodiment of a glass laminate of the invention.

In another embodiment, films A and C have the same size, but a smaller size than film B, resulting in direct contact of both glass sheets with film B at the periphery of the laminate and encapsulated film A and C. These variants are shown in FIG. 1 and FIG. 2.

In yet another embodiment, film C may have the same size as film A and B (i.e. 100%), or less than 99%, 95%, 90%, 80%, 60%, 50%, preferably less than 40%, 30%, 20%, 15% of the surface area of the final laminated glass or of film A and B in the laminate.

The films A and B used in accordance with the invention contain polyvinyl acetals, which are produced by acetalisation of polyvinyl alcohol or ethylene vinyl alcohol copolymer.

The films can contain polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinyl (n)acetal used in accordance with the invention results in particular from the reaction of at least one polyvinyl alcohol with one or more aliphatic unbranched keto-compounds containing 2 to 10 carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals in the films A or B can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The films A or B preferably contain polyvinyl acetals having a proportion of polyvinyl acetate groups based on the layers, either identically or differently, of 0.1 to 20 mol %, preferably 0.5 to 3 mol %, or 5 to 8 mol %.

The polyvinyl alcohol content of the polyvinyl acetals PA of film A having a lower plasticiser content in the starting state may be between 6-26% by weight, 8-24% by weight, 10-22% by weight, 12-21% by weight, 14-20% by weight, 16-19% by weight and preferably between 16 and 21% by weight or 10-16% by weight.

The polyvinyl alcohol content of the polyvinyl acetals PB of film B, which is richer in plasticiser in the starting state, may be between 14-26% by weight, 16-24% by weight, 17-23% by weight and preferably between 18 and 21% by weight.

The films A or B preferably contain uncrosslinked polyvinyl acetal. The use of cross-linked polyvinyl acetals is also possible. Methods for cross-linking polyvinyl acetals are described, for example, in EP 1527107 B1 and WO 2004/063231 A1 (thermal self-cross-linking of polyvinyl acetals containing carboxyl groups), EP 1606325 A1 (polyvinyl acetals cross-linked with polyaldehydes) and WO 03/020776 A1 (polyvinyl acetal cross-linked with glyoxylic acid).

Films A and/or B used in accordance with the invention may contain, as plasticiser, one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

By definition, plasticisers are organic liquids having a high boiling point. For this reason, further types of organic liquids having a boiling point above 120° C. can also be used as plasticiser.

Films A in the variants in which a plasticiser WA is present in film A in the starting state, and also films B particularly preferably contain 1,2-cyclohexane dicarboxylic acid diisononyl ester (DINCH) or triethylene glycol-bis-2-ethyl hexanoate (3GO or 3G8) as plasticiser.

In addition, films A and B may contain further additives, such as residual quantities of water, UV absorber, antioxidants, adhesion regulators, optical brighteners or fluorescent additives, stabilisers, colorants, processing aids, organic nanoparticles, pyrogenic silicic acid and/or surface active substances. In particular, film B may comprise 0.001 to 0.1% by weight of alkaline salts and/or alkaline earth salts of carboxylic acids as adhesion regulators.

In order to avoid corrosion at the heat-shielding layers of film C, film A preferably comprises less than 150 ppm chloride ions and/or nitrate ions and/or sulphate ions.

The chloride content of the film A can thus be less than 150 ppm, preferably less than 100 ppm, and in particular less than 50 ppm. In the ideal case, the chloride content of the film A is less than 10 ppm or even 0 ppm.

The nitrate content of film A optionally may be less than 150 ppm, preferably less than 100 ppm, and in particular less than 50 ppm. In the ideal case, the nitrate content of film A is less than 10 ppm or even 0 ppm.

Again optionally, the sulphate content of film A may be less than 150 ppm, preferably less than 100 ppm, and in particular less than 50 ppm. In the ideal case, the sulphate content of the film A is less than 10 ppm or even 0 ppm.

Film A additionally may comprise more than 0 ppm magnesium ions. The magnesium content is preferably more than 5 ppm, particularly preferably 10 ppm, in particular 5-20 ppm In order to avoid wrinkles in film C, films A and B should have low heat shrinking. Preferably, films A and B are produced in a way that they show at 60° C. within 1 h a heat shrink in the machine direction (extrusion direction) of less than 25%, more preferably less than 15%, or less than 10% and most preferably less than 5%. To the end of measuring shrinkage at the specified temperature, a 10×10 cm piece of film A or B having the extrusion direction marked, is put on a flat tray powdered with fine sand (to provide free movement without sticking to the surface) into an oven set to 60° C. and kept for one hour. The final length is compared to the initial length (10 cm).

In another embodiment, film A has a higher glass temperature Tg (measured by DSC) than film B. Accordingly, glass temperature Tg (measured by DSC) of film A is more than 5° C., more than 10° C. or more than 15° C. higher than the glass temperature Tg (measured by DSC) of film B Preferably, film A has a glass temperature Tg (measured by DSC) higher than 25° C., or higher than 30° C., or higher than 40° C. and most preferably higher than 50° C.

The present invention also relates to a method for producing the described heat-shielding laminated glass laminates, in which the film A and film C are pre-laminated and positioned on a glass sheet, are then covered by at least one film B, and a second glass sheet is then applied. More particularly, film A and C can be co-laminated on a suitable calandering apparatus and wound up and intermediately stored as a roll. This intermediate bi-lam film may then be combined with two plies of glass and film B to obtain a laminate according to the invention. It is strongly preferred that when producing a such pre-laminate from film A and film C where film C carries a functional coating on one of its surfaces, film A will be adhered onto such coated side of film C.

It is possible in accordance with the invention to first melt the duplet composed of film A and film C onto a glass sheet over the entire area or locally by increased temperature and to then cover this with the film B. Alternatively, the duplet from film A and film C and the film B can be positioned jointly between two glass sheets and melted at increased temperature.

The lamination step for producing a laminated glass is preferably carried out such that films A, film C and film B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

What are known as autoclave processes are carried out at an increased pressure from approximately 10 to 15 bar and temperatures from 100 to 145° C. over approximately 2 hours. Vacuum bag or vacuum ring methods, for example according to EP 1 235 683 B1, function at approximately 200 mbar and 130 to 145° C.

What are known as vacuum laminators can also be used. These consist of a chamber that can be heated and evacuated, in which laminated glazing can be laminated within 30-60 minutes. Reduced pressures from 0.01 to 300 mbar and temperatures from 100 to 200° C., in particular 130-160° C., have proven their worth in practice.

In the simplest case, in order to produce the laminated glass laminates, film A and film C or film B is firstly positioned on a glass sheet, and the further film B or film C and A is positioned synchronously or subsequently. The second glass sheet is then applied and a glass film laminate is produced. Excessive air can then be removed with the aid of any pre-lamination method known to a person skilled in the art. Here, the layers are also already firstly lightly adhesively bonded to one another and to the glass.

The glass film laminate may then be subjected to an autoclave process. A previously prepared duplet composed of film A and film C is preferably positioned on the first glass sheet and covered by the thicker film B before the second glass sheet is applied. The method can be carried out in many conceivable and, in principle, practicable variants. For example, the duplet composed of film A and C is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a colour tint, allows the adaptation of the curvature thereof to the upper sheet edge.

In the above described manners to prepare a laminated glass according to the invention, it is important to respect the relative order of film A (contacting a glass surface and film C), film C (encapsulated between film A and film B) and film B (contacting film C and at least one glass surface).

In the automotive field, in particular for the production of windscreens, films that have what is known as a shade band in the upper region are often used. To this end, either the upper part of films A and B can be co-extruded with a suitably coloured polymer melt, or there may be a different colouration in some areas in a multi-layer system of one of the films A and B. In the present invention, this can be achieved by complete or partial colouring of at least one of the films A and B.

In accordance with the invention, films B may therefore have a colour tint, which in particular has already been adapted in a prior process step to the geometry of a windscreen.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

In the simplest case, film B is a commercially available PVB film with or without shade band and with or without a wedge-like thickness profile. Films B with nanoparticles dispersed therein for IR protection can also be used as coloured films. Of course, a film B may also be a film having an acoustic function, such that soundproofing properties that are further improved are obtained by combination with a film A. Of course, a film B may already also combine a number of the mentioned functions.

The thin films A are generally produced by extrusion with use of a cast-film line or in the form of a blown film. Here, a surface roughness may also be produced by controlled melt fracture or with the cast-film method additionally by use of a structured chill roll.

In addition, a film already produced can be embossed with a regular, non-stochastic roughness by means of an embossing process between at least one cylinder pair. Films used in accordance with the invention preferably have a one-sided surface structure with a roughness Rz from 0 to 25 µm, preferably Rz from 1 to 20 µm, more preferably Rz from 3 to 15 µm and in particular an Rz from 4 to 12 µm. It is particularly preferable if the side of film A coming into contact with the glass sheet has a surface roughness Rz of no more than 20% of its thickness. The surface provided with the heat-shielding coating preferably has a particularly low surface roughness prior to application of the coating. In particular, the roughness parameter Ra here is less than 3 µm and Rz is less than 5 µm.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A laminated glass, consisting of two glass sheets interlayered with an interlayer film assembly comprising at least one film A containing a polyvinyl acetal PA and optionally at least one plasticiser WA, at least one film B containing a polyvinyl acetal PB and at least one plasticiser WB and at least one polymer film C, wherein film A comprises less than 16% by weight of plasticiser WA, film B comprises at least 16% by weight of plasticiser WB,
and wherein film C is located between film A and film B, wherein film C is a polyethylene terephthalate (PET) film having a surface roughness parameter Ra of less than 3 μm and a surface roughness Rz of less than 5 μm.

2. A laminated glass, consisting of two glass sheets interlayered with an interlayer film assembly comprising at least one film A containing a polyvinyl acetal PA and optionally at least one plasticiser WA, at least one film B containing a polyvinyl acetal PB and at least one plasticiser WB and at least one polymer film C, wherein film A comprises less than 16% by weight of plasticiser WA, film B comprises at least 16% by weight of plasticiser WB, film C comprises a polyamide, polyethylene terephthalate (PET), polybutylene terephthalate (PBT), polyvinyl alcohol (PVA), polylactic acid (PLA), cellulose acetate, or ionomer polymer, and wherein film C is located between film A and film B, wherein film A contains less than 4 weight percent plasticizer.

3. A laminated glass, consisting of two glass sheets interlayered with an interlayer film assembly comprising at least one film A containing a polyvinyl acetal PA, at least one film B containing a polyvinyl acetal PB and at least one plasticiser WB and at least one polymer film C, wherein film A comprises less than 16% by weight of plasticiser WA, film B comprises at least 16% by weight of plasticiser WB, film C comprises a polyamide, polyethylene terephthalate (PET), polybutylene terephthalate (PBT), polyvinyl alcohol (PVA), polylactic acid (PLA), cellulose acetate, or ionomer polymer, and wherein film C is located between film A and film B, wherein film A contains no plasticizer.

* * * * *